United States Patent [19]

Luciw et al.

[11] Patent Number: 5,644,735

[45] Date of Patent: Jul. 1, 1997

[54] METHOD AND APPARATUS FOR PROVIDING IMPLICIT COMPUTER-IMPLEMENTED ASSISTANCE

[75] Inventors: William W. Luciw, Morgan Hill; Stephen P. Capps, San Carlos; Lawrence G. Tesler, Portola Valley, all of Calif.

[73] Assignee: Apple Computer, Inc., Cupertino, Calif.

[21] Appl. No.: 424,959

[22] Filed: Apr. 19, 1995

Related U.S. Application Data

[60] Division of Ser. No. 99,861, Jul. 30, 1993, Pat. No. 5,477,447, which is a continuation-in-part of Ser. No. 889,225, May 27, 1992, Pat. No. 5,390,281.

[51] Int. Cl.⁶ .................................................. G06F 17/30
[52] U.S. Cl. ............................................. 395/338; 395/336
[58] Field of Search ............................... 395/155, 156, 395/157, 159, 161, 149, 336, 337, 338, 968, 759, 12, 51, 62; 364/419.08, 419.19, 419.1, 419.14, 419.15, 419.13

[56] References Cited

U.S. PATENT DOCUMENTS

| Re. 34,476 | 12/1993 | Norwood | 382/186 |
|---|---|---|---|
| 4,670,848 | 6/1987 | Schramm et al. | 395/60 |
| 4,713,775 | 12/1987 | Scott et al. | 395/50 |
| 4,736,296 | 4/1988 | Katayama et al. | 395/759 |
| 4,862,390 | 8/1989 | Weiner | 395/336 X |
| 4,875,187 | 10/1989 | Smith | 395/141 |
| 4,918,723 | 4/1990 | Iggulden et al. | 379/100 |
| 4,945,504 | 7/1990 | Nakama et al. | 364/709.11 |
| 4,953,106 | 8/1990 | Gansner et al. | 395/140 |
| 4,974,191 | 11/1990 | Amirghodsi et al. | 395/759 |
| 5,091,790 | 2/1992 | Silverberg | 358/434 |
| 5,103,498 | 4/1992 | Lanier | 395/68 |
| 5,109,509 | 4/1992 | Katayama et al. | 395/759 |
| 5,239,617 | 8/1993 | Gardner et al. | 395/12 |

(List continued on next page.)

FOREIGN PATENT DOCUMENTS

| 0441089A2 | 8/1991 | European Pat. Off. . |
| 1-130291 | 5/1989 | Japan . |

OTHER PUBLICATIONS

Wilensky, Robert; Arens, Yigal; and Chin, David, "Talking to UNIX in English: An Overview of UC," Communications of the ACM, Jun. 1984, vol. 27, No. 6, pp. 574 to 593.

Tello, Ernest R., "Natural Language Systems," Savvy PC, Clout 2, Q&A, Lotus HAL, Mastering AI Tools and Techniques, Chapter 2, pp. 25 to 64.

(List continued on next page.)

*Primary Examiner*—Kee M. Tung
*Assistant Examiner*—Crescelle N. dela Torre
*Attorney, Agent, or Firm*—Hickman Beyer & Weaver

[57] ABSTRACT

A method and apparatus for providing computer-assisted implicit and explicit assistance. If no implicit assist actions are desired or indicated, a logical process is initiated to determine whether explicit assistance should be undertaken. If implicit assistance is indicated, a list of action alternatives is displayed for the user. If explicit assistance is desired by the user, particular object(s) from which the assistance may be inferred are entered into an assistance operation. An attempt is made to recognize possible intents expressed by the objects entered into the assistance process. If no user intent is, in fact, recognized, the assist operation is usually terminated. If a possible intent is recognized, the actual intent is hypothesized. A check is further undertaken, to determine whether a hypothesis is in fact available. If no hypothesis is found, the process permits the user to supply a proposed action. If no hypothesis is found and no user action is proposed, assistance efforts terminate. However, if a hypothesis is available, preparations for execution are undertaken. A final inquiry is made as to whether to undertake the hypothesized assist. If the response to an inquiry whether to assist as hypothesized is affirmative, execution of the hypothesized action is undertaken. A pen-based computer preferably implements the indicated functions.

20 Claims, 18 Drawing Sheets

U.S. PATENT DOCUMENTS

| | | | |
|---|---|---|---|
| 5,255,386 | 10/1993 | Prager | 395/605 |
| 5,390,281 | 2/1995 | Luciw et al. | 395/12 |
| 5,432,902 | 7/1995 | Matsumoto | 395/338 |
| 5,477,447 | 12/1995 | Luciw et al. | 395/759 |
| 5,535,323 | 7/1996 | Miller et al. | 395/338 |

OTHER PUBLICATIONS

O'Connor, Rory J., "Apple Banking on Newton's Brain", *San Jose Mercury News*, Wednesday, Apr. 22, 1992.

Hendrix, Gary G. and Walter, Brett A., "The Intelligent Assistant: Technical Considerations Involved in Designing Q&A's Natural–language Interface", *Byte Magazine*, Dec. 1987, vol. 12, Issue 14, p. 251.

Edwards, John R., "Q&A: Integrated Software with Macros and an Intelligent Assistant", *Byte Magazine*, Jan. 1986, vol. 11, Issue 1, pp. 120–122.

Goldberg, Cheryl, "IBM Drawing Assistant: Graphics for the EGA", *PC Magazine*, Dec. 24, 1985, vol. 4, Issue 26, p. 255.

Garretson, R., "IBM Adds 'Drawing Assistant' Design Tool to Graphics Series", *PC Week*, Aug. 13, 1985, vol. 2, Issue 32, p. 8.

Glinert–Stevens, Susan, "Microsoft Publisher: Desktop Wizardry", *PC Sources*, Feb., 1992, vol. 3, Issue 2, p. 357.

Nilsson, B.A., "Microsoft Publisher is an Honorable Start for DTP Beginners", *Computer Shopper*, Feb. 1992, vol. 12, Issue 2, p. 426.

Poor, Alfred, "Microsoft Publisher", *PC Magazine*, Nov. 26, 1991, vol. 10, Issue 20, p. 40, evaluates Microsoft Publisher.

Rampe, Dan, et al. In a Jan. 9, 1989 news release, Claris Corporation announced two products, SmartForm Designer and SmartForm Assistant, which provide "Intelligent Assistance", such as custom help messages, choice lists, and data–entry validation and formatting.

Berry, Deanne, et al. In an Apr. 10, 1990 news release, Symantec announced a new version of MORE (TM).

Elofson, G. and Konsynski, B., "Delegation Technologies: Environmental Scanning with Intelligent Agents", *Journal of Management Information Systems*, Summer 1991, vol. 8, Issue 1, pp. 37–62.

Nadoli, Gajanana and Biegel, John, "Intelligent Agents in the Simulation of Manufacturing Systems", *Proceedings of the SCS Multiconference on AI and Simulation*, 1989.

Sharif Heger, A. and Koen, B. V., "KNOWBOT: an Adaptive Data Base Interface", *Nuclear Science and Engineering*, Feb. 1991, vol. 107, No. 2, pp. 142–157, describes an adaptive interface KNOWBOT.

Ohsawa, I. and Yonezawa, A., "A Computational Model of an Intelligent Agent Who Talks with a Person", *Research Reports on Information Sciences, Series C*, Apr. 1989, No. 92, pp. 1–18.

Ratcliffe, Mitch and Gore, Andrew, "Intelligent Agents take U.S. Bows.", *MacWeek*, Mar. 2, 1992, vol. 6, No. 9, p. 1.

Boy, Guy A., *Intelligent Assistant Systems*, Harcourt Brace Jovanovich, 1991, uses the term "Intelligent Assistant Systems".

*Microsoft Windows User's Guide for the Windows Graphical Environment*; Version 3.0; Microsoft Press copyright 1990–1995.

| INSTANCE | LAST USED |
|---|---|
| ISAAC-1 | T-1 |
| ISAAC-2 | T-2 |
| ISAAC-3 | T-3 |

*Figure 7a*

| INSTANCE | ORDER |
|---|---|
| ISAAC-1 | 1 |
| ISAAC-2 | 2 |
| ISAAC-3 | 3 |

*Figure 7b*

| INSTANCE | TIMES USED |
|---|---|
| ISAAC-1 | 2 |
| ISAAC-2 | 12 |
| ISAAC-3 | 100 |

*Figure 7c*

CALL ISAAC

*Figure 9b*

CALL ISAAC

*Figure 9c*

| 1 | Scheduling | Meet | Person | Place | Day | Time Slot |
|---|---|---|---|---|---|---|
| 2 | Finding | Find | Quantifier | Object | | |
| 3 | Filing | File | Quantifier | Notes | | |

. . .

| 6 | Formatting | Format | Notes | Form | | |
|---|---|---|---|---|---|---|
| 7 | Mailing | Mail | Person | Place | Letter | |
| 8 | Faxing | Fax | Person | Place | Fax # | Notes |
| 9 | Print | Print | Object | Place | | |
| 10 | Calling | Call | Person | Place | Phone | |

*Figure 14b*

METHOD AND APPARATUS FOR PROVIDING IMPLICIT COMPUTER-IMPLEMENTED ASSISTANCE

Cross-Reference to a Related Application

This application is divisional of U.S. patent application Ser. No. 08/099,861, filed on Jul. 30, 1993, now U.S. Pat. No. 5,477,447, under the title "METHOD AND APPARATUS FOR PROVIDING COMPUTER-IMPLEMENTED ASSISTANCE" on behalf of Luciw et. al. and assigned to the same assignee as herein; which application is incorporated herein by reference in its entirety. Application Ser. No. 08/099,861 is a continuation-in-part of Ser. No. 889,225, issued U.S. Pat. No. 5,390,281 filed May 27, 1992 and issued Feb. 14, 1995 and which is incorporated herein by reference in its entirety. Priority rights based upon this earlier filed United States Patent are claimed.

BACKGROUND OF THE INVENTION

The present invention relates generally to computer systems, and more particularly to computer-implemented assistance methods and apparatus.

Computerized personal organizers are becoming increasingly popular with a large segment of the population. Computerized personal organizers tend to be small, lightweight, and relatively inexpensive, and can perform such functions as keeping a calendar, an address book, a to-do list, etc. While many of these functions can also be provided in conventional computer systems, personal organizers are very well suited to the personal organization task due to their small size and portability. Personal organizers are available from such companies as Sharp and Casio of Japan.

A relatively new form of computer, the pen-based computer system, holds forth the promise of a marriage of the power of a general purpose computer with the functionality and small size of a personal organizer. A pen-based computer system is typically a small, hand-held computer where the primary method for inputting data includes a "pen" or stylus. A pen-based computer system is commonly housed in a generally rectangular enclosure, and has a dual-function display assembly providing a viewing screen along one of the planar sides of the enclosure. The dual-function display assembly serves as both an input device and an output device. When operating as an input device, the display assembly senses the position of the tip of a stylus on the viewing screen and provides this positional information to the computer's central processing unit (CPU). Some display assemblies can also sense the pressure of the stylus on the screen to provide further information to the CPU. When operating as an output device, the display assembly presents computer-generated images on the screen.

The dual-function display assemblies of pen-based computer systems permit users to operate the computer as a computerized notepad. For example, graphical images can be input into the pen-based computer by merely moving the stylus on the surface of the screen. As the CPU senses the position and movement of the stylus, it generates a corresponding image on the screen to create the illusion that the stylus is drawing the image directly upon the screen, i.e. that the stylus is "inking" an image on the screen. With suitable recognition software, text and numeric information can also be entered into the pen-based computer system in a similar fashion.

One approach to computerized assist operations is to provide assistance automatically when a situation in which assistance could be provided is recognized. However, such an approach may provide unsatisfactory results when the user is provided with assistance that is unwanted or disproportionate.

Simply stated, concerns have arisen about assist functions being undertaken by the computer without adequate user control and interaction. When the assist function has been undertaken without adequate user control, assistance would be provided awkwardly and at times when the assistance was not necessarily desired.

It is essential that the control, the timing, and the application of the assistance is considered appropriate and well-tuned. The confidence of the user is undermined when the assistance provided only obliquely addresses particularized user needs without precisely providing the particular results objectively and subjectively required.

SUMMARY OF THE INVENTION

According to the invention, a method and apparatus has been developed for providing computer-assisted implicit and explicit assistance for a variety of user-supportive information functions. If no implicit assist actions are desired or indicated, then a logical process is initiated to determine whether explicit assistance should be undertaken. If implicit assistance is indicated, a list of action alternatives is displayed for the user. Alternatively, a process can be undertaken to automatically select a best action alternative of several identified alternatives.

If explicit assistance is desired by the user, particular object(s) from which the assistance may be inferred are entered into an assistance operation. An attempt is then made to recognize possible intents expressed by the objects entered into the assistance process. If no user intent is, in fact, recognized, the assist operation is usually terminated. If a possible intent is recognized, the actual intent is hypothesized. A check is further undertaken, to determine whether a hypothesis is in fact available. If no hypothesis is found, the process permits the user to supply a proposed action. If no hypothesis is found and no user action is proposed, assistance efforts terminate. However, if a hypothesis is available, preparations for execution are undertaken. A final inquiry is made as to whether to undertake the hypothesized assist. If the response to an inquiry whether to assist as hypothesized is affirmative, execution of the hypothesized action is undertaken.

Accordingly, it is an intent of the invention to provide user explicit assist functions which are provided under oversight and with the interaction of the user, and implicit assist functions in certain structured instances. The involvement of the user in the implementation of implicit assist operations is a key aspect of the invention. User intent is not merely deduced, but specific user queries are made to ensure controlled application of assist operations.

These and other advantages of the present invention will become apparent upon reading the following detailed descriptions and studying the various figures of the drawings.

BRIEF DESCRIPTION OF THE DRAWINGS

FIGS. 7a–7c show selected examples of heuristic rules of thumb which are effective in making automatic choices between alternative ISAACs, respectively directed toward selection schemes such as selecting the last used ISAAC, selecting the last in order of ISAACs according to particular position within a selected table, and finally selecting a particular ISAAC based upon prior frequency of choice of that particular ISAAC.

FIG. 9b–9c indicate graphically the performance of the selection query operation as expressed in FIG. 9A.

FIG. 14b illustrates an example of a confirmation of action slip that could be produced upon completion of a particular activity, in this case completion of the process of faxing information to another party.

DETAILED DESCRIPTION OF THE PREFERRED EMBODIMENTS

The present invention is well suited for pointer based computer systems such as the pen-based, pen-aware and mouse controlled systems that are currently popular. For the purposes of illustration, the invention will be described in connection with a pen-based system.

Figure 1:
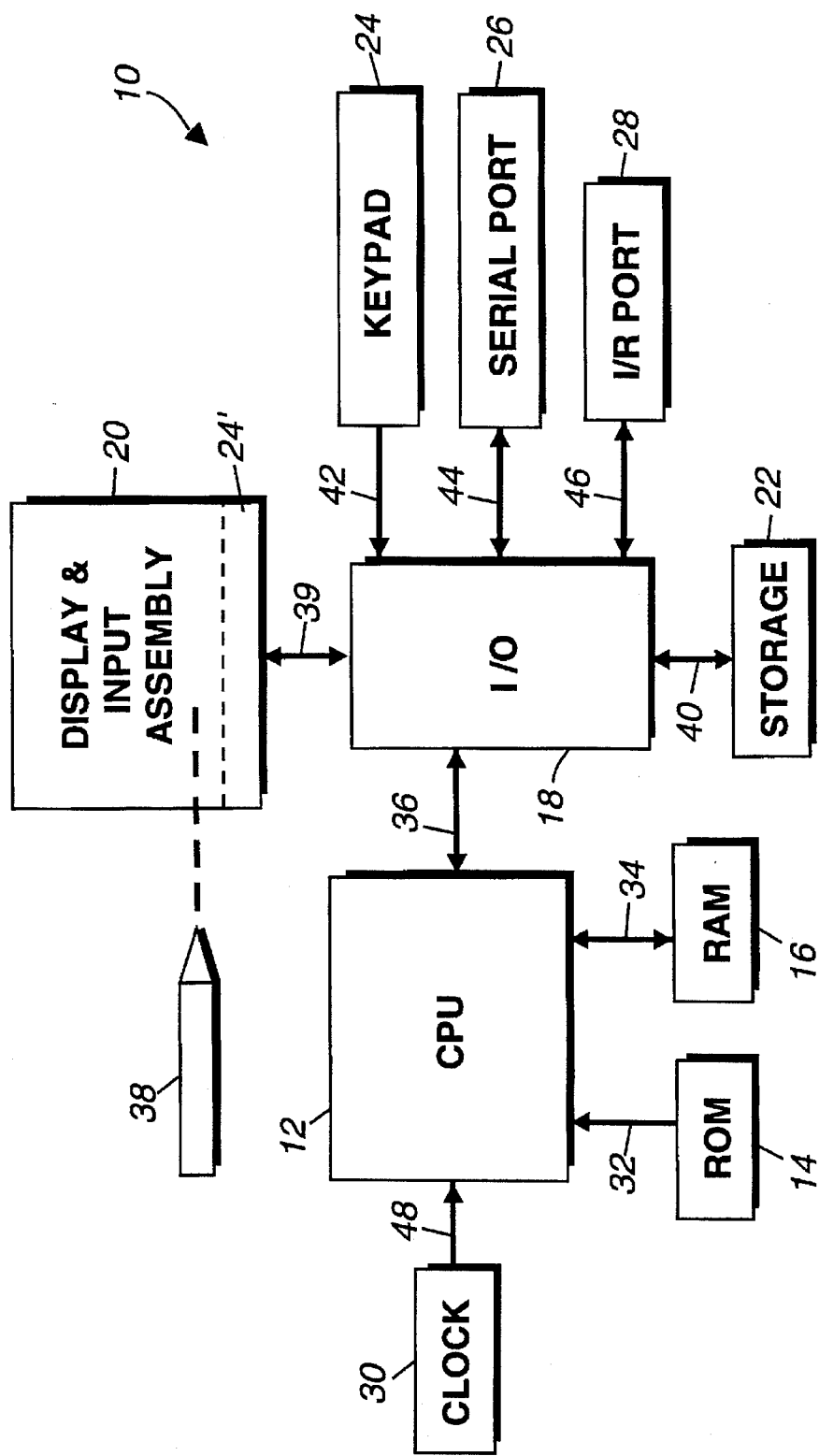
FIG. 1 is a block diagram of a computer system in accordance with the present invention.

As shown in FIG. 1, a pen-based computer system 10 in accordance with the present invention includes a central processing unit (CPU) 12, read only memory (ROM) 14, random access memory (RAM) 16, input/output (I/O) circuitry 18, and a display assembly 20. The pen-based computer system 10 may also optionally include a mass storage unit 22, a keypad (or keyboard) 24, a serial port 26, an infrared (I/R) port 28, and a clock 30.

The CPU 12 is preferably a commercially available, single chip microprocessor. While CPU 12 can be a complex instruction set computer (CISC) chip, it is preferable that CPU 12 be one of the commercially available, reduced instruction set computer (RISC) chips which are known to be of generally higher performance than CISC chips. CPU 12 is coupled to ROM 14 by a unidirectional data bus 32. ROM 14 contains the basic operating system for the pen-based computer system 10. CPU 12 is connected to RAM 16 by a bi-directional data bus 34 to permit the use of RAM 16 as scratch pad memory. ROM 14 and RAM 16 are also coupled to CPU 12 by appropriate control and address busses, as is well known to those skilled in the art. CPU 12 is also coupled to the I/O circuitry 18 by bi-directional data bus 36 to permit data transfers with peripheral devices.

I/O circuitry 18 typically includes a number of latches, registers and direct memory access (DMA) controllers. The purpose of I/O circuitry 18 is to provide an interface between CPU 12 and such peripheral devices as display assembly 20, mass storage 22, keypad 24, serial port 26, and I/R port 28.

Display assembly 20 of pen-based computer system 10 is both an input and an output device. Accordingly, it is coupled to I/O from a variety of vendors. The input device of display assembly 20 is preferably a thin, clear membrane which covers the LCD display and which is sensitive to the position of a stylus 38 on its surface. With such a structure, the display assembly 20 can serve as an input "tablet." These position sensitive membranes are also readily available on the commercial market. Alternatively, other types of tablets can be used, such as inductively coupled tablets. Combination display assemblies such as display assembly 20 which include both the LCD and the input membrane are commercially available from such vendors as Scriptel Corporation of Columbus, Ohio.

Some type of mass storage 22 is generally considered desirable. Mass storage 22 can be coupled to I/O circuitry 18 by a bi-directional data bus 40. However, the mass storage 22 can be eliminated by providing a sufficient amount of RAM 16 to store user application programs and data. In that case, the RAM 16 can be provided with a backup battery to prevent the loss of data even when the pen-based computer system 10 is turned off. However, it is generally desirable to have some type of long term mass storage 22 such as a commercially available miniature hard disk drive, nonvolatile memory such as flash memory, battery backed RAM, a Personal Computers Memory Card International Association (PCMCIA) card, or the like.

Figure 2:
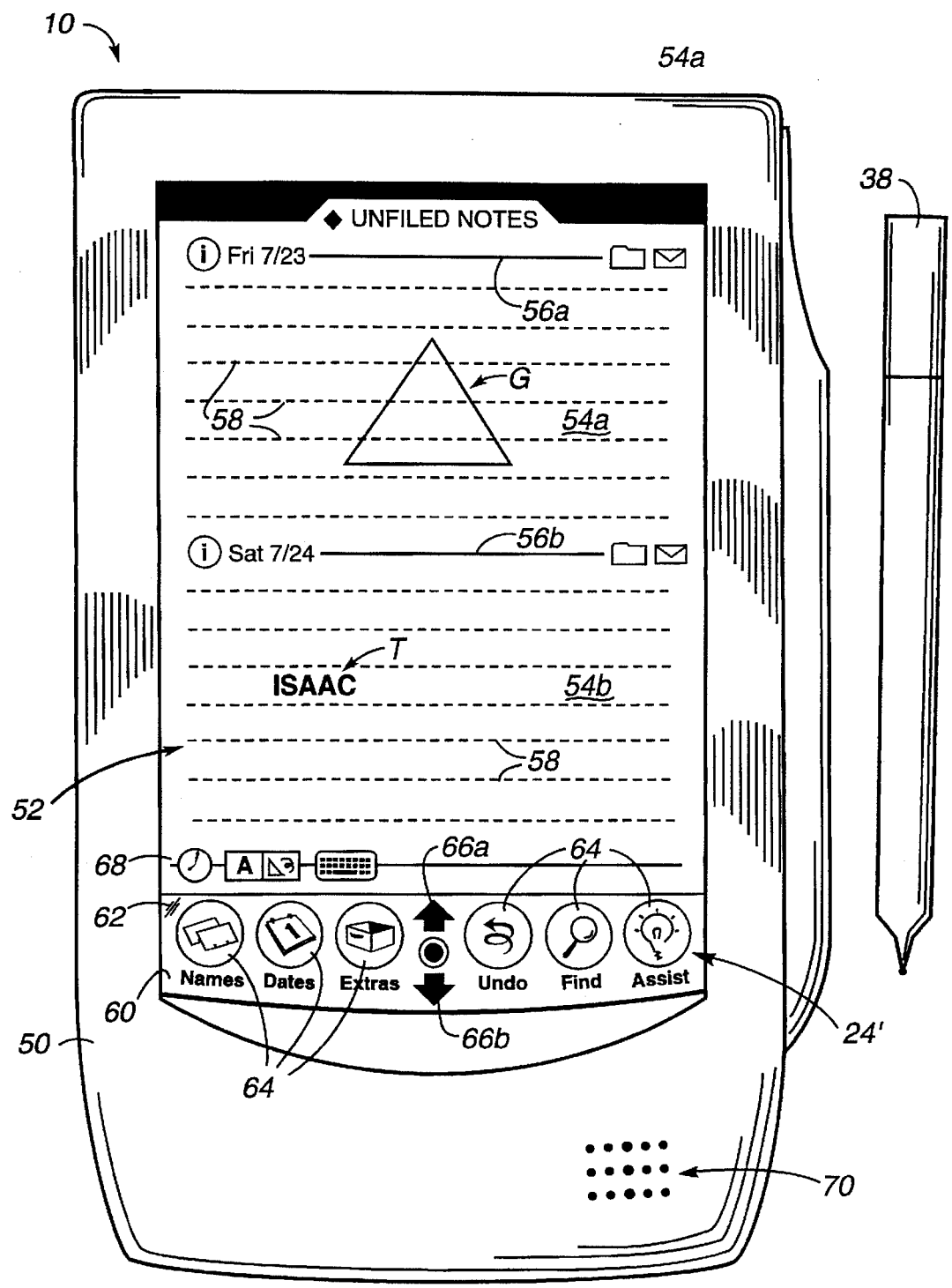
FIG. 2 is a top plan view of the screen, case, and keypad of the computer system of FIG. 1.

The keypad 24 can comprise an array of mechanical buttons or switches coupled to I/O circuitry 18 by a data bus 42. Alternatively, keypad 24 can comprise an entire, standard QWERTY keyboard. In the present embodiment, a separate keypad 24 is not used in favor of a "pseudo" keypad 24'. This "pseudo" keypad 24' comprises "button" areas which are associated with a bottom edge of the tablet membrane that extends beyond the lower edge of the LCD display. These button areas are defined by a printed or silk-screened icons which can be seen through the transparent membrane of the input tablet. When the "buttons" are selected by engaging the stylus 38 with the membrane over these printed icons, the membrane senses the pressure and communicates that fact to the CPU 12 via data bus 38 and I/O 18. An example of pseudo keypad 24' is shown in FIG. 2.

Other types of pointing devices can also be used in conjunction with the present invention, for example, an interrupt port of the CPU 12 which can count the clock pulses to provide the time function. However, this alternative clock embodiment tends to be wasteful of CPU processing power. Clock 30 is coupled to CPU 12 by a data bus 48.

In operation, information is input into the pen-based computer system 10 by "writing" on the screen of display assembly 20 with the stylus 38. Information concerning the location of the stylus 38 on the screen of the display assembly 20 is input into the CPU 12 via data bus 38 and I/O circuitry 18. Typically, this information comprises the Cartesian (i.e. x & y) coordinates of a pixel of the screen of display assembly 20 over which the tip of the stylus is positioned. Commercially available combination display assemblies such as the aforementioned assemblies available from Scriptel Corporation include appropriate circuitry to provide the stylus location information as digitally encoded data to the I/O circuitry of the present invention. The CPU 12 then processes the data under control of an operating system. While the method of the present invention is described in the context of a pen-based system, other pointing devices such as a computer mouse, a track ball, or a tablet can be used to manipulate a pointer on a screen of a general purpose computer. Therefore, as used herein, the terms "pointer", "pointing device", "pointing means", and the like will refer to any mechanism or device for pointing to a particular location on a screen of a computer display.

Serial port 26 is coupled to I/O circuitry by a bi-directional bus 44. The serial port 26 can be used to couple the CPU to external devices and networks.

Infrared (I/R) port 28 is coupled to I/O circuitry by a bi-directional bus 46. The I/R port can be used for outgoing information (e.g. to control a printer or some other external device, or to communicate with other computer systems) or for incoming information from other computers or devices.

Clock 30 preferably comprises a real-time clock to provide real-time information to the system 10. Alternatively, clock 30 can simply provide regular clock pulses td possibly an application program stored in ROM 14, RAM 16, or mass storage 22. The CPU 12 next produces data which is transferred to the display assembly 20 via I/O circuitry 18 and data bus 38 to produce appropriate images on the screen portion of the display assembly 20.

In FIG. 2, the pen-based computer system 10 of FIG. 1 is shown housed within a generally rectangular enclosure 50. The CPU 12, ROM 14, RAM 16, I/O circuitry 18, and clock 26 are preferably fully enclosed within the enclosure 50. The display assembly 20 (FIG. 1) is mostly enclosed within the enclosure 50, but a viewing screen 52 of the display assembly is exposed to the user. As used herein, the term "screen" will refer to the portion of the display assembly 20 which can display an image that can be viewed by a user. Also accessible to the user is the pseudo keypad 24' that was described with reference to FIG. 1.

Upon power-up, pen based computer system 10 displays on screen 52 an initial "note" area 54a including a header bar 56a and a number of guidelines 58. The header bar 56a preferably includes the date of creation of the note area 54a and a number of icons and "soft" buttons, not particularly germane to the discussion of the present invention. For this reason, the header bar 56a will not be discussed in detail herein. The optional guidelines 58 aid a user in entering text, graphics, and data into the pen-based computer system 10. A graphic object G in the form of a triangle is shown entered within note area 54a.

Additional note areas, such as a note area 54b, can be formed by the user by drawing a substantially horizontal line across the screen 52 with the stylus 38. The substantially horizontal line is recognized by the system 10 and is converted into a second header bar 56b. Additional text, graphical, and other data can then be entered into this second note area 54b. For example, the text object T comprising "ISAAC" has been entered into second note area 54b.

In this preferred embodiment, the keypad 24', as explained previously, comprises a printed or silk-screened member 60 provided beneath a lower edge of a thin, clear, stylus-sensitive membrane 62 of the input "tablet." Alternatively, a keypad could comprise a mechanical keypad (or keyboard) 24, or a keypad could comprise "soft buttons" i.e. images generated at convenient locations on the screen 52, in which case a "button" would be activated by touching the stylus to the screen over the image of the button. The keypad 24' preferably includes a number of dedicated function buttons 64 and a pair of scroll buttons 66a and 66b. The operation of the note areas 54a, 54b, etc., scroll buttons 66a and 66b, and other aspects of computer system 10 are discussed in greater detail in co-pending U.S. patent application 07/868,013, filed Apr. 13, 1992 on behalf of Tchao et al., assigned to the assignee of the present invention and incorporated herein by reference in its entirety.

The screen illustrated in FIG. 2 is referred to as the "notepad", and is preferably an application program running under the operating system of the pen based computer system 10. In this preferred embodiment, the notepad is a special or "base" application which is always available beneath higher level applications. The notepad application, like other applications, runs within a window, which in this instance comprises the entire viewing screen 52. Therefore, as used herein, a "window" is the entire screen or any portion of an entire screen which is dedicated to a particular application program.

A status bar 68 is provided at the bottom of the notepad application. The status bar 68 is provided with a number of active and display areas, which again are not particularly germane to the present invention and will therefore not be discussed in detail herein. U.S. patent application Ser. No. 07/976,970 filed Nov. 16, 1992 on behalf of Foster et. al, entitled "Status Bar for Application Windows" and assigned to the assignee of the present invention describes how to make and use the status bar, and is incorporated herein by reference in its entirety.

The enclosure 50 is preferably provided with apertures 70 which permit the free transmission of sound from a speaker (not shown) which is housed within enclosure 50. The speaker can be driven by the CPU 12, by I/O circuitry 18, or by specialized sound chips, as is well known to those skilled in the art. The speaker can be used to provide user feedback, or to transmit audible information to a user.

The term "object" will be used extensively in the following discussions. As is well known to software developers, an "object" is a logical software unit comprising data and processes which give it capabilities and attributes. For example, an object can be queried as to its type and can return such data as the number of words that it contains, what its bounding box (BBOX) is, etc. Objects can contain other objects of the same or of a different type. Objects can also be used to project images on a screen according to their object type. Example of object types used in the following description include paragraph, line, and word objects. There are many well known texts which describe object oriented programming. See, for example, *Object Oriented Programming for the Macintosh*, by Kurt J. Schmucher, Hayden Book Company, 1986.

In the present invention, objects are preferably implemented as part of a frame system that comprises frame objects related by a semantic network. A description of semantic networks can be found in "A Fundamental Tradeoff in Knowledge Representation and Reasoning", *Readings in Knowledge Representation*, by Brachman and Leveseque, Morgan Kaufman, San Mateo, 1985.

It will be noted there is a liberal use of graphic elements in the present invention. For example, the header bars 56a and 56b include lines and other graphical elements. Processes for drawing lines on a computer screen are well known to those skilled in the art. For example, graphics software such as QUICKDRAW from Apple Computer, Inc. of Cupertino, California can be used to draw lines, simple geometrical shapes, etc. A description of the QUICKDRAW graphics software is found in the book *Inside Macintosh, Volumes I, II, and III*, by C. Rose et al., Addison-Wesley Publishing Company, Inc., July 1988. With such graphics software, a line can be drawn by simply specifying the coordinates of the beginning and the end of the line, and by specifying the width of the line.

Another preferred tool for implementing the system of the present invention is a view system. Various types of view systems are well known to those skilled in the art. In the present system, the notepad application on the screen 52 forms a first or "root" layer, with the status bar 68, for example, positioned in a second layer "over" the root layer. The various buttons of the status bar 68 are positioned in a third layer "over" the second and root layers. The view system automatically handles "taps" and other gestures of the stylus 38 on the screen 52 by returning information concerning the tap or gesture and any object to which it may be related. Again, the status bar 68 and the view system is described in greater detail in co-pending U.S. patent application 7/976,970, which has been incorporated herein by reference. It is therefore clear that the object oriented programming and view system software makes the implementation of the processes of the present invention less cumbersome than traditional programming techniques. However, the processes of the present invention can also be implemented in alternative fashions, as will be well appreciated by those skilled in the art.

Figure 3:
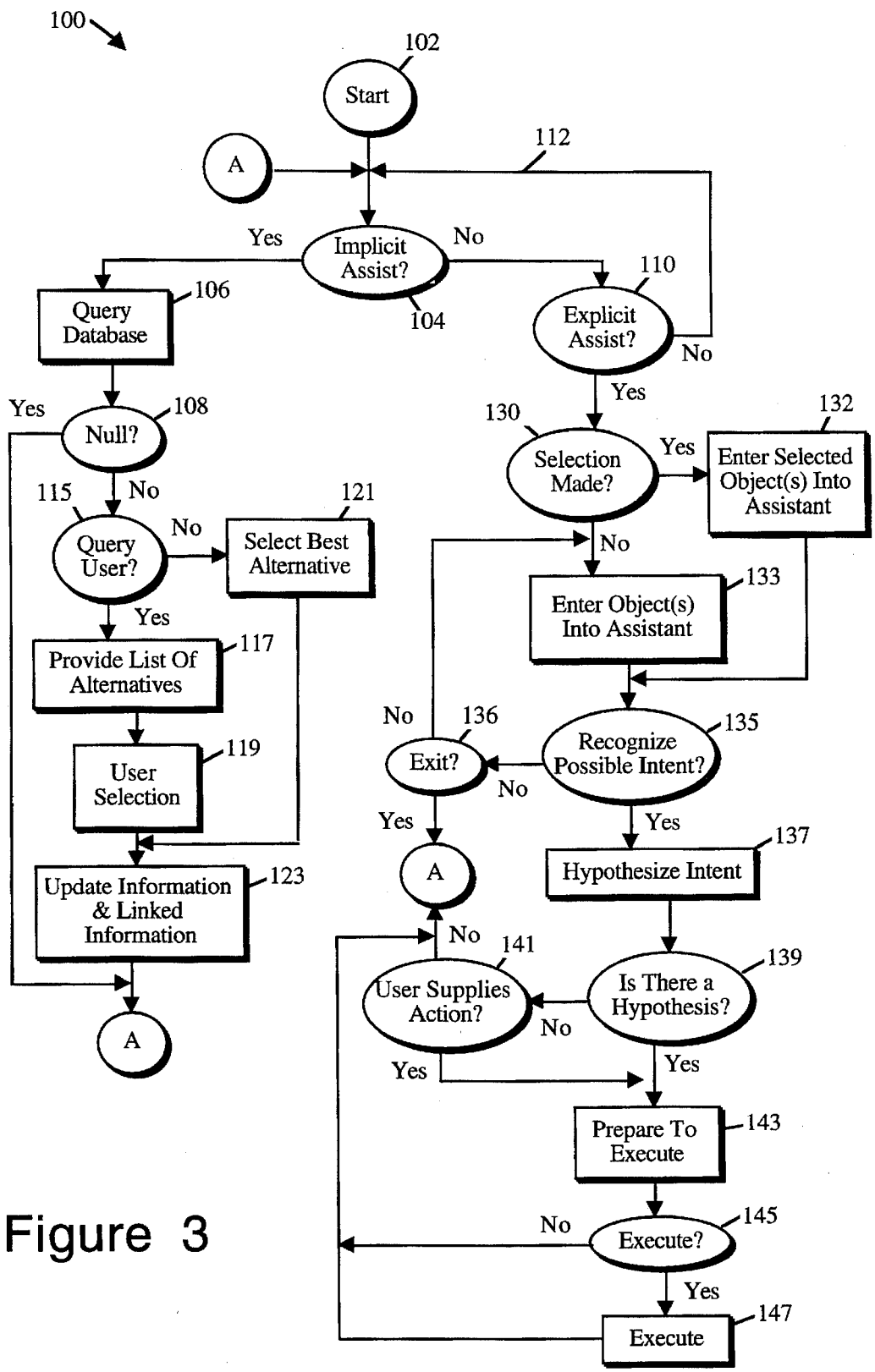
FIG. 3 is a flow diagram of a process according to the invention for providing controlled computer-assisted user assistance.

A method or process 100 for providing implicit or explicit assistance in the provision of computer implemented services in accordance with the present invention is shown in FIG. 3. The process begins at step 102 on power-up of the computer system 10 and runs concurrently with other system functions.

At step 104, the process recognizes whether or not an implicit assistance function is to be provided by computer system 10. As will be seen, implicit assistance may, for example, arise from an entry into a smart field by a users. If a user does enter information into a "smart field," the computer database will be queried at step 106 to determine whether assistance is possible given the user input.

A smart field is considered to be a predefined region on screen 52 of computer system 10 shown in FIG. 2, or a predefined region within a window which appears on screen 52, as suggested below with reference to FIG. 46b and which will be discussed in greater detail in the text description below associated with that Figure. For convenience, the smart fields are typically rectangular in shape. The particular geographic bounds of a smart field can conveniently be stored in computer memory by simply saving four numbers defining the corners of the rectangular shape of the field. A particular field is considered smart, because of the specialized capabilities of the smart field to respond with particularized effectiveness and intelligence to user needs, indications, or events registered, for example, by pen 38, within the bounds of the particular smart field.

However, implicit assist may be indicated not just by entry of an indication in a smart field, but by the happening of any of a number of predefined allowable events which lead to a query of the database at process step 106. A user entry made into a smart field is not the only way computer system 10 is caused to undertake an implicit assist operation. Certain kinds of events on screen 52, for example, such as the writing of a particular indication or word on screen 52 outside of a particular smart field may trigger an implicit assist. In general, implicit assist can be triggered by the happening of any of a number of predefined allowable events.

If, however, a decision is made at decision process 104 not to perform the implicit assist function or approach suggested in FIG. 3, a check is made at decision process 110 whether an explicit assist function should be undertaken. If neither implicit or explicit assist is indicated at decision processes 104 and 110, operation continues past point A and along line 112 repeatedly checking for an indication whether implicit or explicit assistance is required, at the two decision processes 104 and 110.

An example of an indication of user desire to have explicit assistance undertaken is the act of using pen 38 in FIG. 2 to tap or click on the assist icon or button 64 shown on the surface of stylus-sensitive membrane 62 or a keypad 24 including a range of dedicated function buttons 64. If the query at process step 108 produces a negative, i.e., null, response to the question of whether any implicit assist actions are available in the database of computer 10, indicating that no assistance actions are identified for performance, then process control returns to point A.

If a non-null result to the query for implicit assistance has been established by step 108, a determination is made at process step 115 as to whether the user should be queried. This determination can be made by the system, or can be set by the user in a preference field. If it is decided that the user should be queried, step 117 displays a list of action alternatives for user selection. The user can make the selection of a particular assistance action according to step 119, by highlighting the particular course of action selected, for example. Alternatively, if it is desired that no user query is desired for selection of a particular mode of assistance, then a process is undertaken at step 121 to select the best alternative.

In either the case of an automatic selection of a best alternative according to process step 121 or in the case of steps 117 and 119 involving a presentation of alternatives to the user followed by user selection of a particular alternative, i.e., whether a user query has been undertaken, or whether an automatic selection of a best alternative has been made, upon accomplishment of the selected assistance action, the database information and any linked information are updated at step 123. Once implicit assistance has been completed, process control returns to point A. If step 104 determines that there is no implicit assist, then step 110 determines if there is an explicit assist to be undertaken. For example, if the name ISAAC had been entered on screen 52 of FIG. 2 and no time-out had occurred, and additionally the assist button (the rightmost of buttons 64) had been clicked, then an explicit assist will have been requested. If an explicit assist has been indicated at step 110, then a step 130 determines, if a particular selection as to the explicit assistance has been made. Selection is typically made by clicking on a particular word with pen 38, for example, and thereby highlighting the item selected. If a user selection has been made, particular selected objects are entered into the assistance operation in step 132. If no user selection has been made, objects entered since a delimiter are entered into the assistant in a step 133. Since no objects have specifically been selected, the objects to be entered into the assistant are selected automatically by a delimiter process.

An example of how the delimiter process can be accomplished, for example, involves the entry of only those objects on the screen 52 which are delimited in some fashion from the other objects which may have been entered on the screen. For example, if several paragraphs have been entered on the screen, only the last paragraph's objects will be considered for entry as objects into the assistant. Time may also be used as a delimiter. For example, if a considerable period of time separates a given object on the screen from another, only the most recent object will be entered into the assistant. The time threshold separating the particular objects may for example be a pre-set time-out.

Next, an attempt is made at step 135 to recognize the possible intent expressed by the objects entered into the assistance process. If no intent is recognized, the explicit assistance operation is considered for local termination by return of process control to point A, according to decision process 136, or for continuation by return to the top of step 133 to wait for new objects which might permit intent to be recognized or to await user or process intervention.

If a possible intent is recognized at step 135, the intent is hypothesized at step 137. Next, step 139 checks whether there is a hypothesis available. If no hypothesis is found, process step 141 permits the user to supply a proposed action. If no hypothesis is found and no user action is proposed, process control returns to point A. However, with the availability of a user supplied action or if a hypothesis is available, preparations for execution of actions consistent with the action requested or hypothesized are undertaken at step 143. A final inquiry is raised at step 145 as to whether to undertake the ordered or hypothesized assistance action. This final inquiry may entail simply permitting the user to supply a verb such as "call" for example, before the calling process, if that is the action hypothesized, is actually launched. If the response to the inquiry is affirmative, execution is undertaken at step 147. Process control returns to point A in either case after execution by step 147 or by refusal to execute according to a decision made by process 145.

Figure 4A:
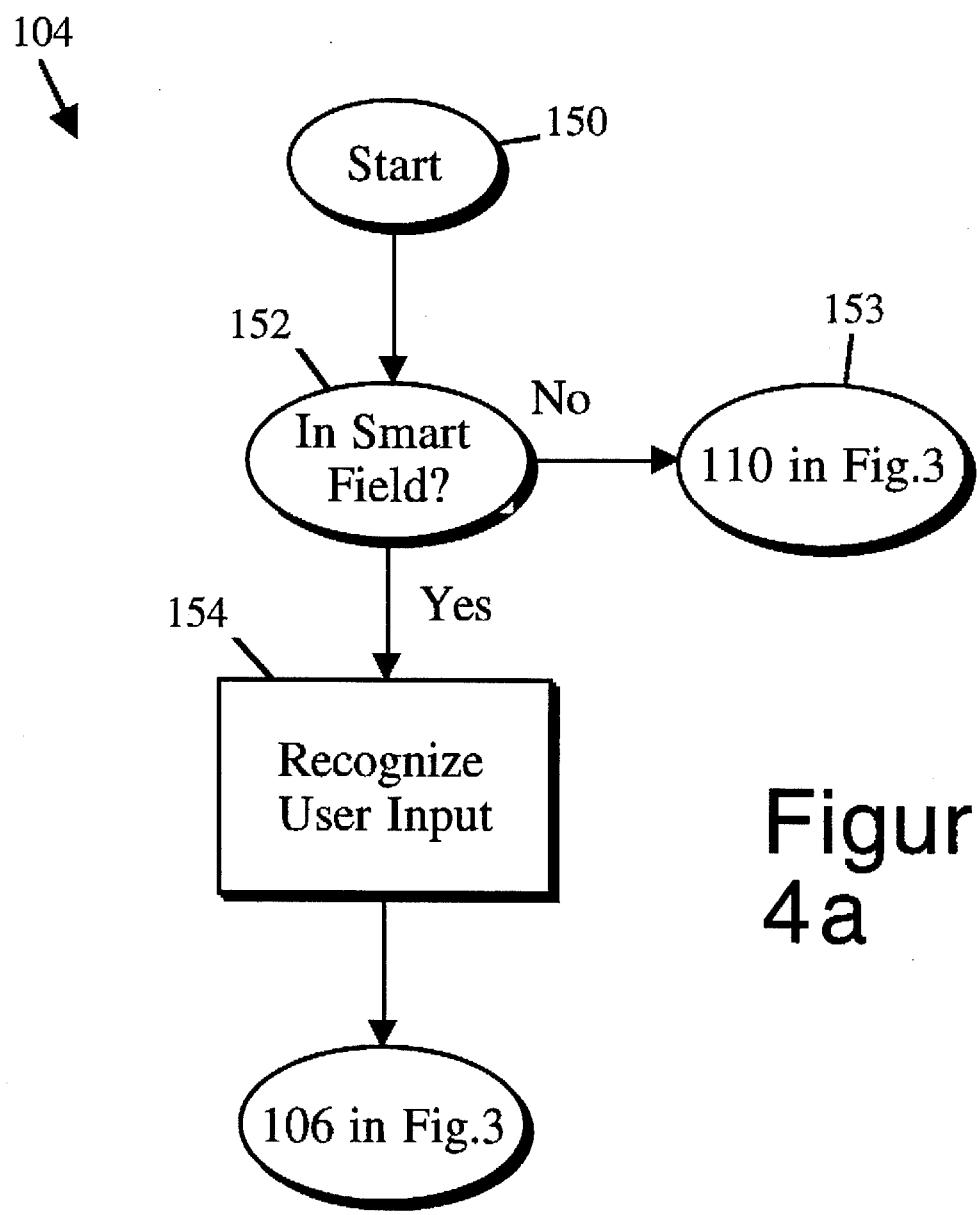
FIG. 4a shows a process for determining whether or not implicit assistance is desired by the user, in connection with providing computer assisted support to the user.

FIG. 4a shows an example of a process for determining whether or not implicit assistance is desired at step 104. Once the question has arisen whether or not implicit assistance is desired, the determination process under FIG. 4a is undertaken or started at step 150. Implicit assistance is considered to be desired, for example, if a handwritten entry is made in a smart field as per step 152. If the result is that no implicit assistance is desired, then a query at a step 153 about explicit assistance is undertaken as previously suggested at step 110. If the entry in the smart field has been made by the user, the assistance process takes action to identify or recognize the kind of implicit assistance indicated at a step 154. After recognition has been accomplished, operation continues as suggested in FIG. 3 at step 106 with a query of the database.

Figure 4B:
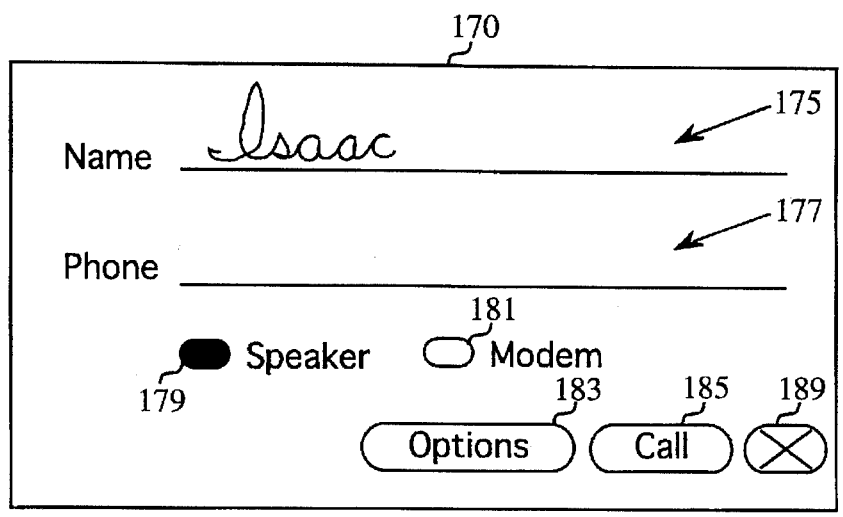
FIG. 4b shows an example of an implicit assist operation with a phone slip window having a smart name field evoked, for example, by either highlighting the verb "call" or by writing it on the note field before evoking window.
Figure 4C:
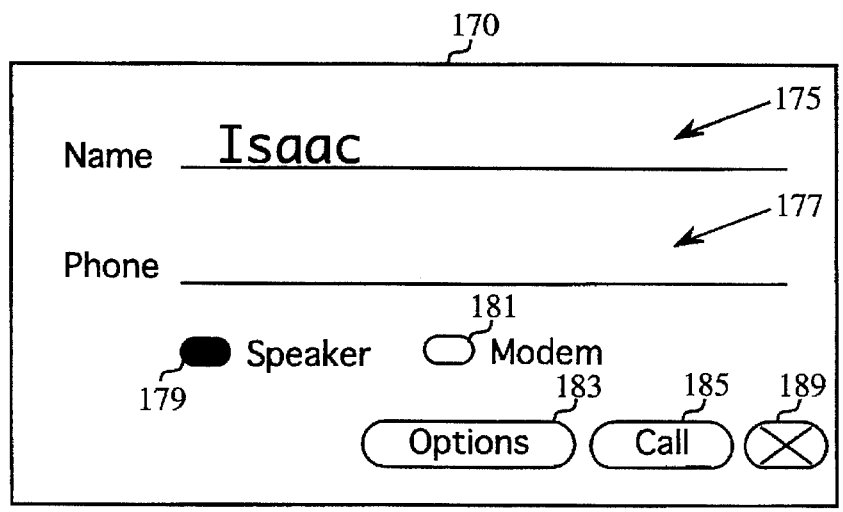
FIG. 4c shows the phone slip window of FIG. 4b with the name formal font form. ISAAC having been recognized and established in the name field in FIG. 5 shows an example of a generic <PERSON> type frame along with a particular set of specific frames of the <PERSON> type.

An example of an implicit assist operation is provided with reference to FIG. 4b. The Figure shows a phone slip window 170 with a smart name field 175 which has for example been evoked by either highlighting the verb "call" or by simply writing the word on the display surface either before or after establishment of window 170. Once the particular window 170 is presented to the user, the name ISAAC can be handwritten into the particular smart field 175. The assistance process recognizes the handwritten name "Isaac," and either continues operation as suggested at step 106 in FIG. 3 directly, or concurrently displays the recognized name in formal font form, as suggested in FIG. 4c, in the same position of the smart field, where formerly the handwritten name "Isaac" had been established. As will readily be recognized, window 170 in FIG. 4b may contain several smart fields, in this case for example definable for either the "name" field 175 or a "phone" field shown at step 177. By way of an aside, it is further noted on the face of window 170, that a speaker block 179 has been selected, indicating, for example, that a tone produced by a speaker element (not shown) is capable of being evoked. Alternatively, a modem option, indicated at step 181, can be selected. Further options can be displayed in a pull-down menu button 183 entitled "options" at step 183 which can be presented as a help menu. Additionally, a "call" activity can be undertaken by selecting a "call" button 185 indicated on the face of window 170. Finally, window 170 can be closed simply by selecting the "x" block shown in window 170.

Figure 5:
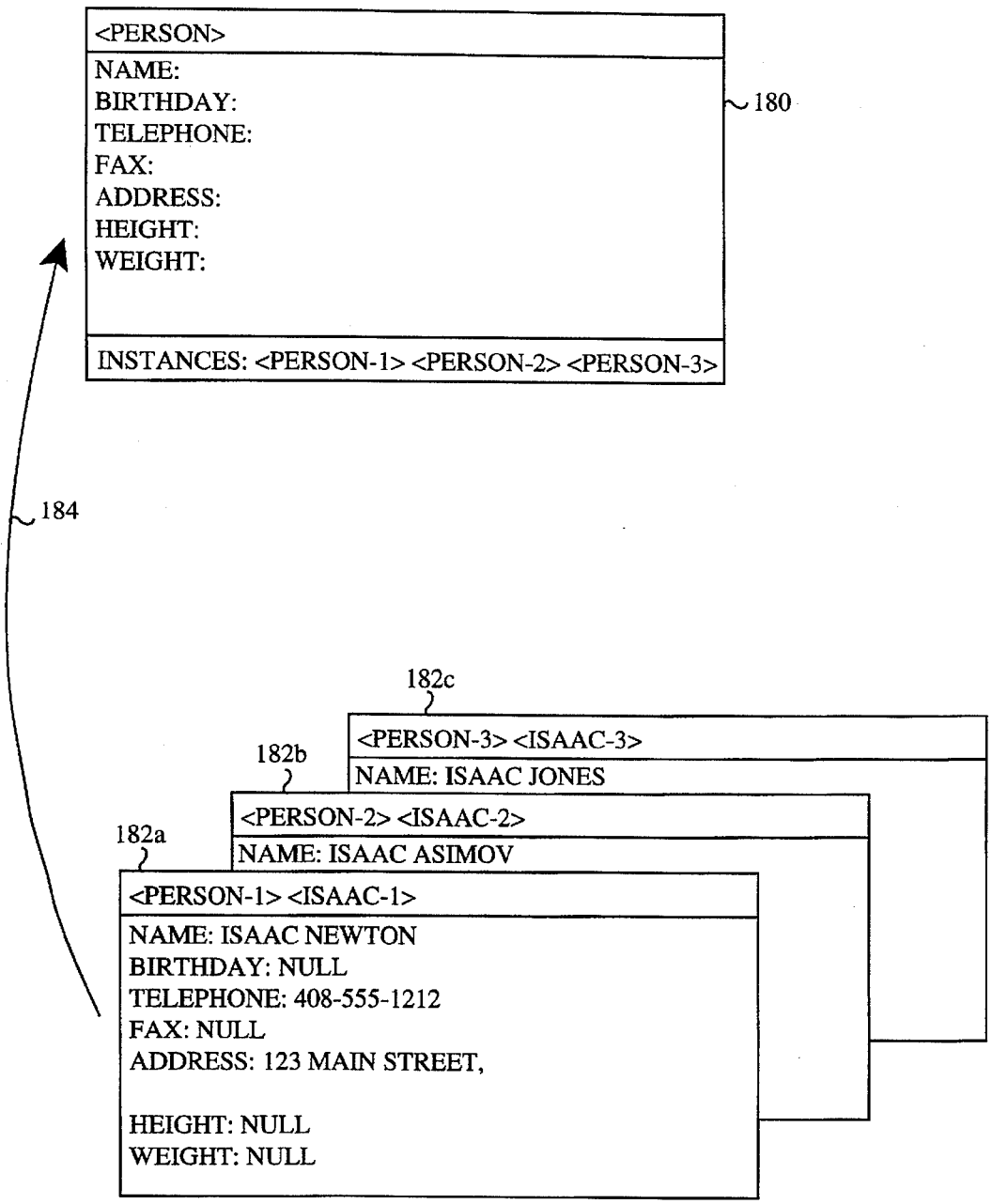

Details of one way to carry out the database query process indicated in FIG. 3 at step 106 can be understood in connection with FIG. 5. In particular, FIG. 5 illustrates a frame 180 which is a special case of a frame, referred to commonly as a "type" frame, as the frame refers to a particular type, i.e., the type <PERSON>. Particular instances of the type <PERSON> are shown as frames. Frame 180 has a number of slots for various attributes of being a person, such as NAME, BIRTHDAY, TELEPHONE, FAX, etc. Frame 180 also includes a list of all frames which are an instance of the type frame <PERSON>, namely <PERSON-1>, <PERSON-2>, and <PERSON-3>.

Frames 182a, 182b, and 182c are "instance" frames of the type <PERSON>. For example, frame 182a is an instance <PERSON-1> of frame 180, and has the name <ISAAC-1>. Frame 182a is provided with the same slots as frame 180, except some of the slots are filled with data. For example, the NAME slot of frame 182a is filled with the name "ISAAC NEWTON." Untilled slots have a null value or can be set to a default value. Likewise, frames 182b and 182c have slots filled with data about their ISAACs. As depicted by the arrow 184, there is a "IS-A" link between the instances frames 182a–182c and the type frame Semantic networks are well known to those skilled in the art of building knowledge bases. A description of semantic networks can be found in "A Fundamental Tradeoff in Knowledge Representation and Reasoning", *Readings in Knowledge Representation*, by Brachman and Leveseque, Morgan Kaufman, San Mateo, 1985. The frame system is an elaboration of a semantic network. See, Brachman and Leveseque, supra. Frame systems elaborate on the structure of types themselves and their attributes. Specifically, frame systems have three aspects:

1) Values of attributes are stored explicitly or stored as a default value that the individual slot can inherit. This effectively caches some of the graph traversal.
2) Value or role restriction are constraints that must be satisfied by attribute values. These restrictions can constrain a value to be of a certain type (known as value class), of a certain maximum or minimum cardinality (in the case of multivalued slots), or a combination of both.
3) Attached procedures (also known as daemons or angels) that are invoked when a values is accessed (either by getting or setting). This allows values to be computed on-the-fly. The procedures can be completely arbitrary or be expressed in a restricted language. In either case, the procedure returns the computed value and whatever side-effects that may have occurred.

Frames used in the present invention have a number of slots which may contain data, daemons, or other frames. Slots are accessed by making assertions to the knowledge base. For example, if it was desired to retrieve all of the frames that were colored red, a typical frame accessor language query would be in the form of:

(QUERY (MEMBER-VALUE COLOR ?xRED)

and would return a list of frames that have a COLOR slot whose value is red. Compound queries can also be made.

Figure 6A:
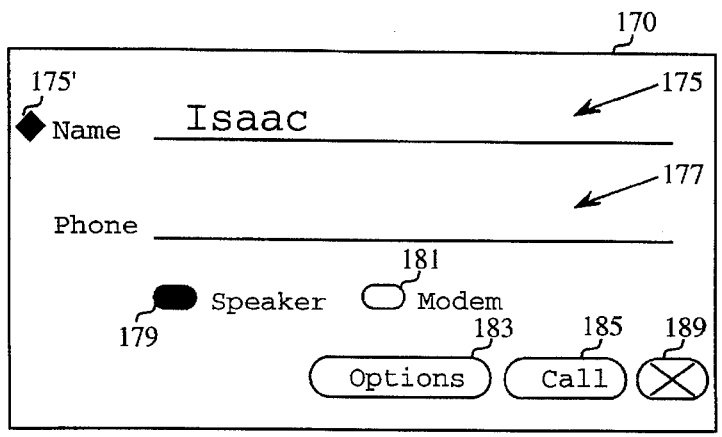
FIGS. 6a–6c show respective assist windows in successive stages of an assist process, including first a window containing a first informational level directed at the name ISAAC alone, a second window with a pop-up menu offering a user choice among several known ISAACs, and a third window showing the selection of a particular ISAAC, that is ISAAC ASIMOV, having been accomplished.
Figure 6B:
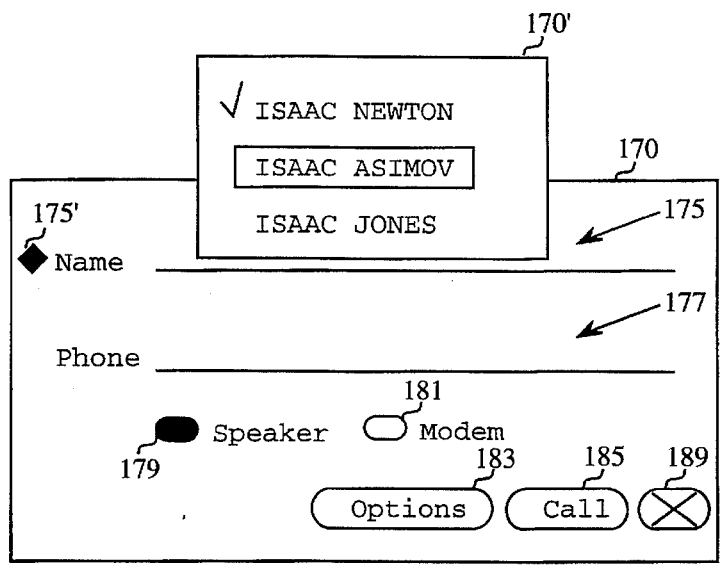
Figure 6C:
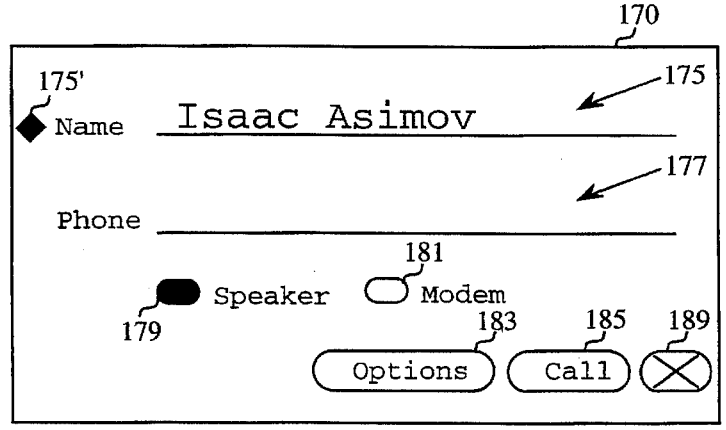

Shown in FIGS. 6a–6c is the process of user selection of a particular assistance option indicated at steps 117 and 119 in FIG. 3. The phone slip window 170 in FIG. 6a is shown with a smart name field 175. The name ISAAC has been recognized in smart field 175 and displays the recognized name in formal font form. As noted above, window 170 in FIG. 4b contains an additional smart field, i.e., "phone" field 177. Additionally, speaker block 179 has been selected, indicating that a tone is capable of being evoked. Alternatively, a modem option, indicated at step 181, can be selected. Further options can be displayed in a pull-down menu button entitled "options" at step 183 which can be presented as a help menu. As already noted above, a "call" activity can be undertaken by selecting "call" button 185 indicated on the face of window 170. Window 170 can be closed simply by selecting the "x" block shown in window 170. Significantly, to the left of the name field is a diamond icon 175' which can be invoked to produce a pull-down menu of selection items (not shown) which permit the user to initiate further assistance operations.

FIG. 6b illustrates a presentation of assistance options to the user in connection with step 117 in FIG. 3. Responsive to the recognition of the name ISAAC, the assistance process has produced a list of alternatives by earlier query of the database per step 106 in FIG. 3. In particular, three ISAAC are presented for selection of one of them, the presentation being made in an overlay window 170, positioned partially over the underlying window 170. The user-selected "ISAAC ASIMOV" is shown having been marked for selection by a rectangle indicating a highlighting operation. FIG. 6c illustrates the completion of the selection process, with the full name in formal font of ISAAC ASIMOV being presented in the name field 175 of window 170.

Figure 7:
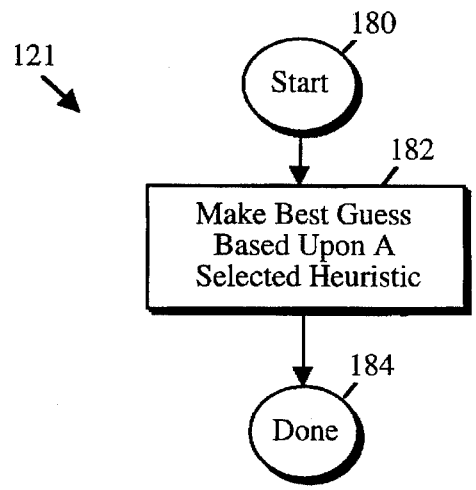
FIG. 7 illustrates a brief flow diagram illustrating a heuristic process for the selection of a particular choice among alternatives when the user is not queried for selection of alternatives.

FIG. 7 illustrates a basic process which can be used to implement selection of a best alternative absent user selection, as suggested at step 121 of FIG. 3. Simply stated, the process calls for applying a particular selected procedure for choosing among one of several options, once the process is initiated at step 180 in FIG. 7. The selection process for example entails making a best guess based upon a selected heuristic approach as would be well-known to one skilled in the art, as suggested at step 182. This heuristic approach may for example follow the approach suggested in any one of FIGS. 7a–7c.

FIG. 7a presents a "last used" selection scheme for determining which of several alternatives automatically to select. Three instances are presented for selection, in this case, three "ISAACs," namely ISAAC-1, ISAAC-2, and ISAAC-3. In a next row of the table of FIG. 7a are presented indications of the times at which the particular ISAAC instance on the particular row was last used. As shown, the instance ISAAC-1 was last used at time T-1. The instance ISAAC-2 was last used at time T-1. Finally, the instance ISAAC-3 was last used at time T-3. According to the particular heuristic approach presented at FIG. 7a, it is expected that ISAAC-2 will be chosen, assuming that T-1 is earlier in time.

FIG. 7b presents another such heuristic approach, permitting the automatic choice between alternative instances. In the approach shown, selection would be accomplished by a "top-of-the-list" selection process, not requiring any user interaction. The heuristic approach suggested in FIG. 7c is based upon the principle of most frequent use. The table presented suggests that ISAAC-3 again would be selected, based upon the highest number of uses over a particular period of time, in comparison with the usage level of the remaining instances, ISAAC-1 and ISAAC-2.

Figure 8A:
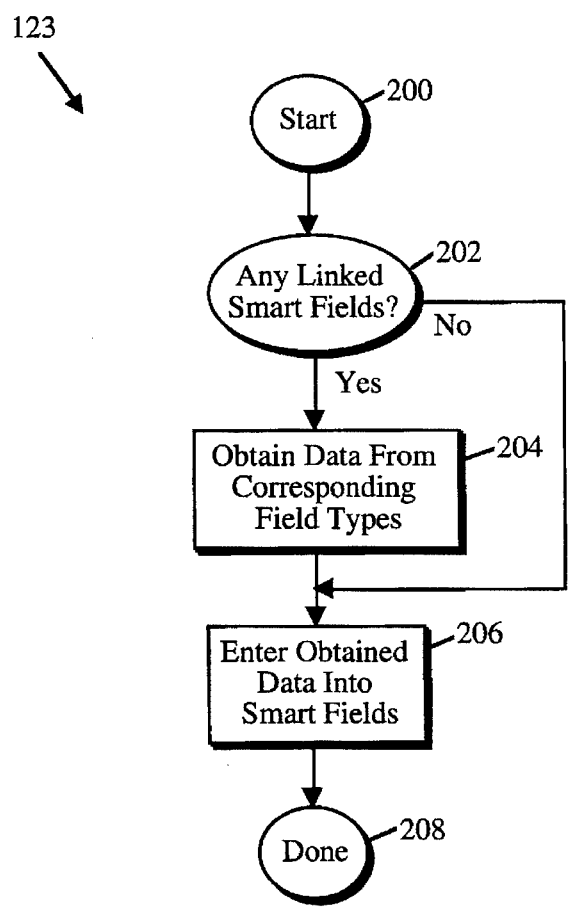
FIG. 8a is a flow diagram illustrating the updating process for data base information in linked smart fields.

FIG. 8a illustrates details of the operation of step 123 of FIG. 3 dealing with the updating of information and linked information in smart fields. In the earlier example of FIG. 6c in which it was decided that Isaac Asimov was the desired ISAAC, the phone information in window 170 had not yet been entered. This information may be available and can be accessed according to the process of FIG. 8a. The process starts at 200 and immediately checks the data base for any linked smart fields as indicated at 202. If there are applicable smart fields which contain the desired phone number information, this data is obtained from the corresponding linked field types as suggested at 203. Then, as suggested at 206, the data obtained is entered into the applicable smart field of the window 170 under operation. In the absence of there being any linked fields available, the data obtaining step of 204 is skipped and the data is entered manually, if available. Otherwise, the phone data field will remain vacant as to that particular data element. Operation of updating information and linked information in accordance with step 123 of FIG. 3 is completed with step 208 in FIG. 8a.

Figure 8B:
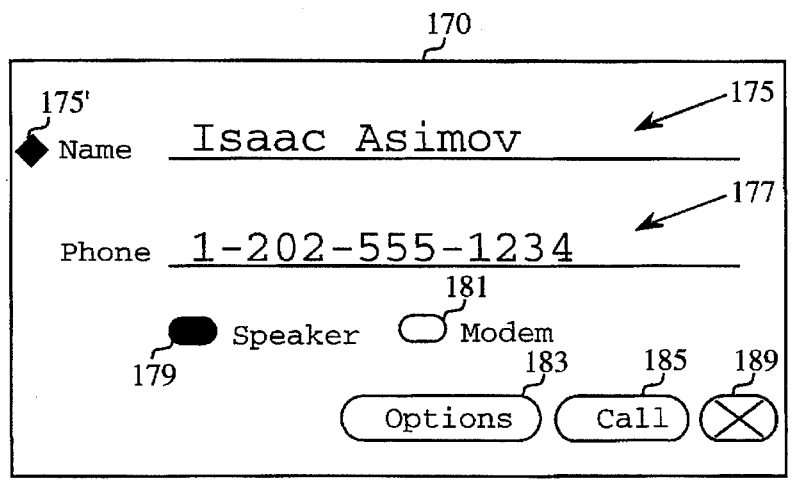
FIG. 8b is a call slip illustration of an updated smart field window in which the phone number field information has been updated.

FIG. 8b illustrates the completion of a successful data updating operation performed according to the procedure of FIG. 8a. Speaker block 179 in FIG. 8b has been selected, to enable tone evocation of the phone number as for tone dialing in connection with a telephone call. Alternatively, a modem option, indicated at 181, can be selected. A pull-down menu button entitled "options" at 183 can be produced as a help menu. Further, a "call" activity can be undertaken by selecting "call" button 185 indicated on the face of window 170. Window 170 can be closed simply by selecting the "x" block shown in window 170. To the left of the name field is diamond icon 175' which can be invoked to produce a pull-down menu of verbs (not shown) to permit the user to initiate further assistance operations.

Figure 9A:
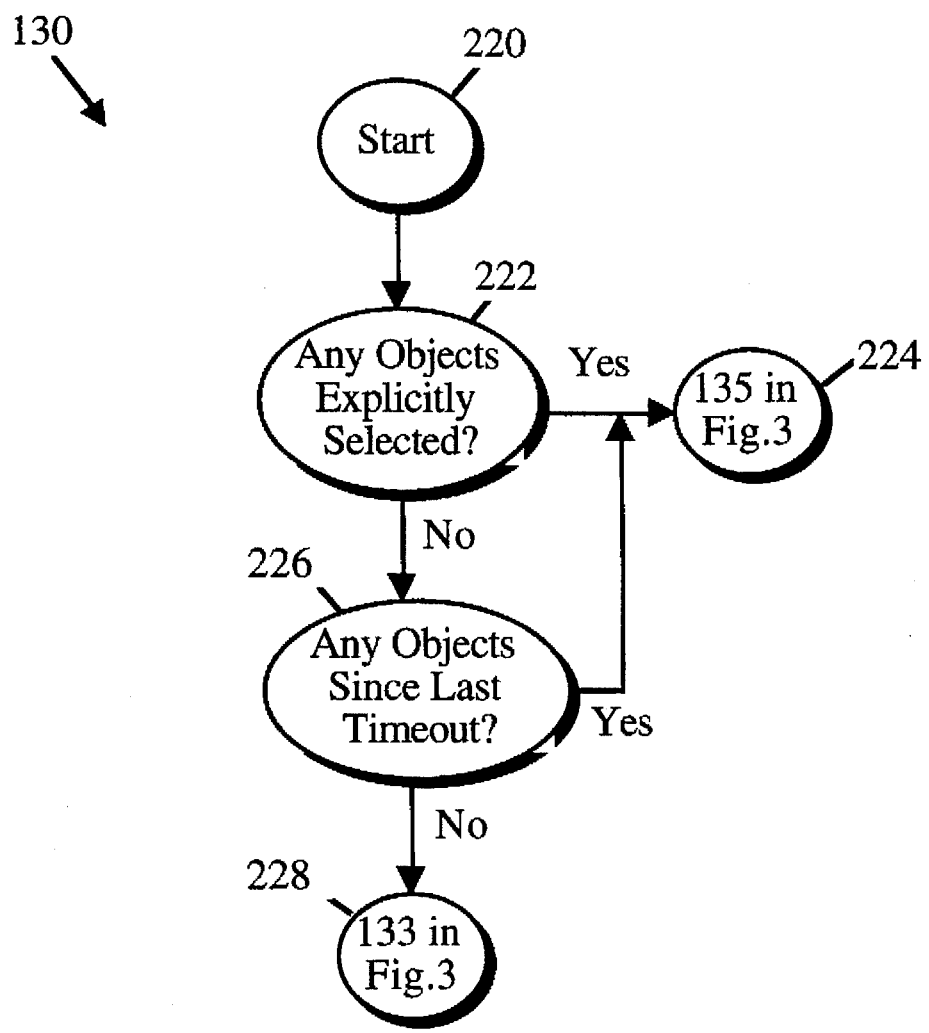
FIG. 9a is a flow diagram of the process according to the invention in which a query is made as to whether a specific selection has been made as to a particular object.

FIG. 9a shows the process of checking whether a specific selection has been made of a particular object, as suggested at 130 in FIG. 3. The process of checking for the selection of a particular object begins at 220 in FIG. 9a and is conducted at 222. If no object has been explicitly selected, a query is made regarding the availability of any objects for selection which may have been available since the last time out. A time out can be defined as a paragraph, or as a particular set period of time. A paragraph can be denoted as simply the character expressed by pressing the ENTER key or the carriage return on a keyboard. If no object have been explicitly selected at 222 and no objects have been available since the last time out, then the assistance process continues in a step 228 as suggested at step 133 in FIG. 3 with the entry of objects into the assistant. If, however, a selection of an object has been made according to 222 or 226 in FIG. 9a, then the process can continue at 224 with transference of the assistance activity to entry of the specific object(s) into the assistant operation, as suggested at step 135 in FIG. 3.

FIGS. 9b–9c indicate graphically the performance of the selection query operation as expressed in FIG. 9a. In FIG. 9b the objects CALL ISAAC are indicated. In FIG. 9c, these objects are highlighted or blocked off to denote selection of the particular objects.

Figure 9D:
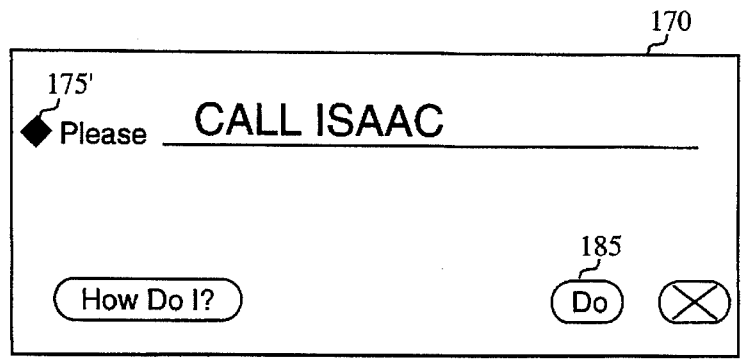
FIG. 9d illustrates the transferal of the highlighted objects of FIG. 9c transferred to a selected window.

FIG. 9d shows the highlighted objects transferred to window 170, to perform entry of the selected object(s) into the assistant. Such entry into the assistant function need not be accompanied by actual transferal into window 170 and may be transparently performed without direct user awareness. However, actual display of the entry into assistant operation of the face of the display is considered to be a useful and user friendly approach. The function CALL ISAAC is consequently performable by simply tapping the DO field at 185.

Figure 10A:
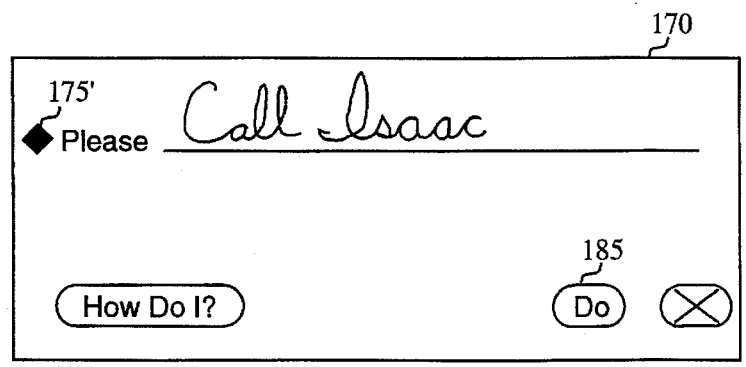
FIG. 10a illustrates the input of a handwritten object into a smart field in a window.
Figure 10B:
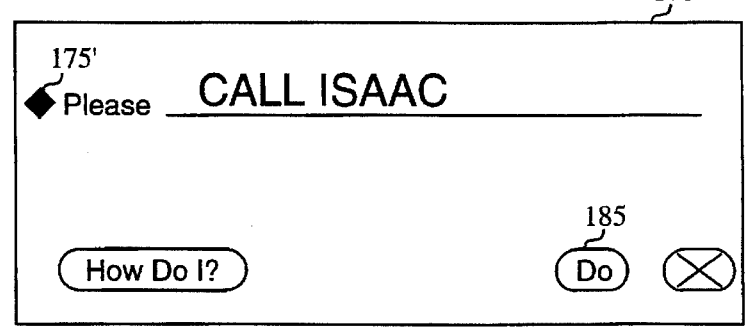
FIG. 10b illustrates the recognition of the handwritten object of FIG. 10a and its conversion into formal font form.

In the event that no selection has been made as to objects to be entered into the assistant, object(s) can be directly entered into the assistant as suggested at step 133 in FIG. 3. Such direct entry of object(s) into the assistant can be accomplished as suggested in FIGS. 10a and 10B. Entry of the objects is directly into the call field of window 170 of FIG. 10a, by pen in handwriting for example. The input handwritten objects are duly recognized and converted to formal font form as re-expressed in the call field and as shown in FIG. 10B.

Figure 11A:
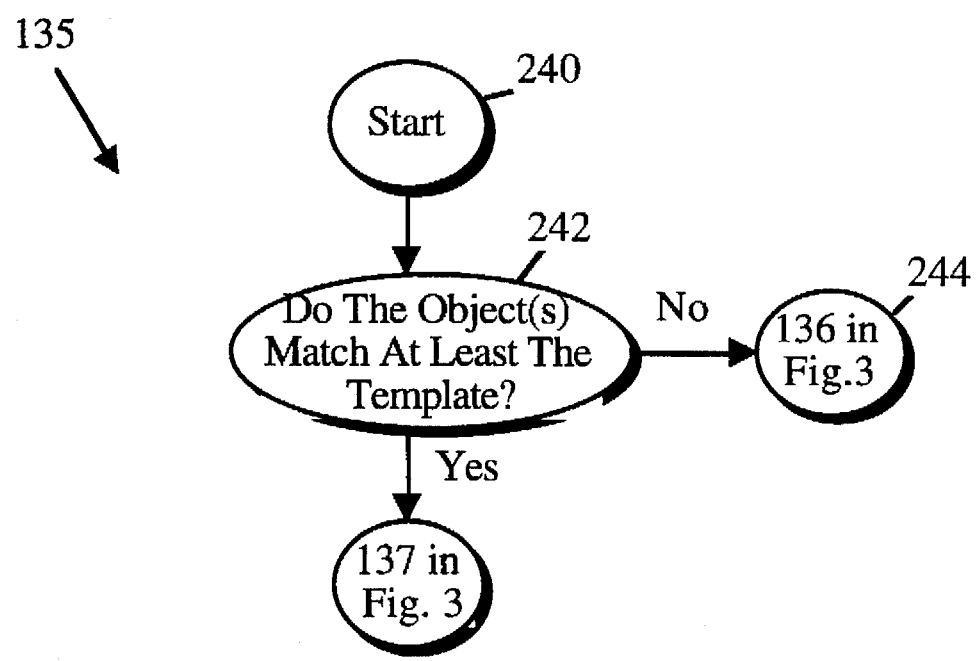
FIG. 11a is a flow diagram illustrating the recognition of objects process.
Figures 11B, 11C:
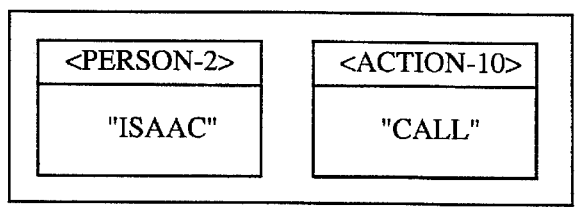
FIG. 11b illustrates an object combination under operation.
FIG. 11c shows a template for organizing in preset form a variety of object combinations.

FIG. 11a shows the recognition of object(s) process which is part of FIG. 3 at 135, in order to enable recognition of possible user intent. The recognition process is started at step 240 in FIG. 11a. Next, a decision step 242 determines whether the object(s) match at least one template. If not, the process continues at a step 244 which corresponds to step 136 of FIG. 3. If so, the process continues at step 137 of FIG. 3. In substance, the process aims to determine whether the object(s) match at least one of the templates of object combinations set forth in FIG. 11c. FIG. 11b illustrates the object combination under operation, denoted by kind of object. The verb CALL is considered to be an action object and ISAAC is considered to be a person object. The two objects in combination are subject to template comparison. The template in FIG. 11c is effective for organizing in preset form the various object combinations which are capable of further operation as particular functions to be accomplished. FIG. 11c illustrates selected example functions such as scheduling, finding, filing, formatting, mailing, faxing, printing, and calling, just to cite a few of the possibilities.

FIG. 11c further provides example kinds of action objects, such as meet, find, file, format, mail, fax, print, and call. The Figure provides examples of allowable combinations of objects which correspond to the indicated functions and actions. For example, essential objects for scheduling a meeting include four objects, such as person, place, day, and time slot. Finding activities require the combination of two objects, which are for example a quantifier and an object. Filing requires a quantifier and notes. Formatting require notes and form, mailing requires a person, a place, and a letter. Faxing requires a person, a place, a fax number, and notes. Printing requires an object and a place. Calling requires a person, a place, and a phone number.

The recognition of possible user intent process called for at 135 in FIG. 3 and expressed in example form at FIG. 11a, calls for a matching operation between particular noted object(s) such as those illustrated in FIG. 11b and those expressed in the template of FIG. 11c. In this particular example, the intent is not obscure. The object <CALL> is clearly specified. There is a template match with the calling function expressed in the template. Both the action "call" and the person to be called are present in the template, permitting an effective, though not complete match. The place and the phone number are yet to be determined.

Figure 12A:
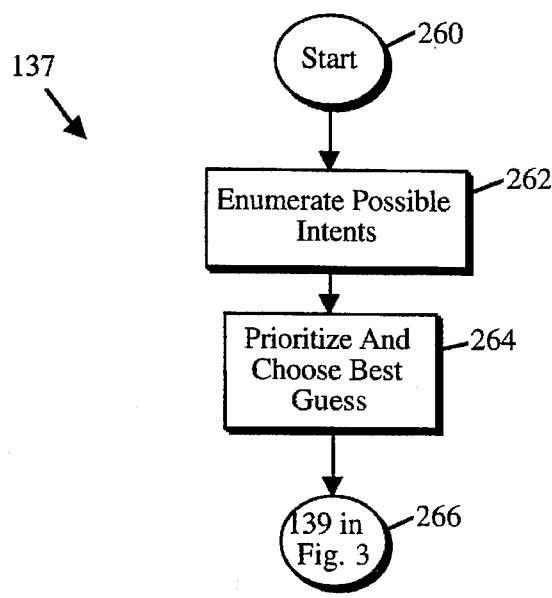
FIG. 12a illustrates a process for hypothesizing user intent as to particular activities.

In many instances, intent will not so clearly be evident. For example, them may be multiple function matches based upon a particular combination of objects. Accordingly, it will be imperative to hypothesize the actual user intent based upon a selection of alternatives, as suggested at 137 in FIG. 3. The process for hypothesizing user intent is made explicit in FIG. 12a. Once the hypothesizing process begins at step 260, it continues with the enumeration of all possible intents, as indicated at step 262. Then, prioritization is accomplished and a choice is made as to the best guess, as noted at step 264. Finally, the process continues at step 266 with the FIG. 3 query at 139 whether in fact a hypothesis has been established as to whether a particular assistance activity is desired.

If no hypothesis has been produced, as determined by the answer to the query made at 139 of FIG. 3, then the user may supply a proposed assistance course of action, as suggested at 141 of FIG. 3. This is made more explicit in FIG. 12b. For example, a user proposed o course of action can be determined by the process beginning at step 270 of FIG. 12b. As a threshold step, it is asked whether the user wishes to enter a particular action, according to the step noted at step 272 of FIG. 12b. If there is no desire by the user to enter a particular course of action, operation returns to point A of FIG. 3, and the cycle of inquiring whether an implicit assist is desired is made, according to 104 of FIG. 3.

Figure 12B:
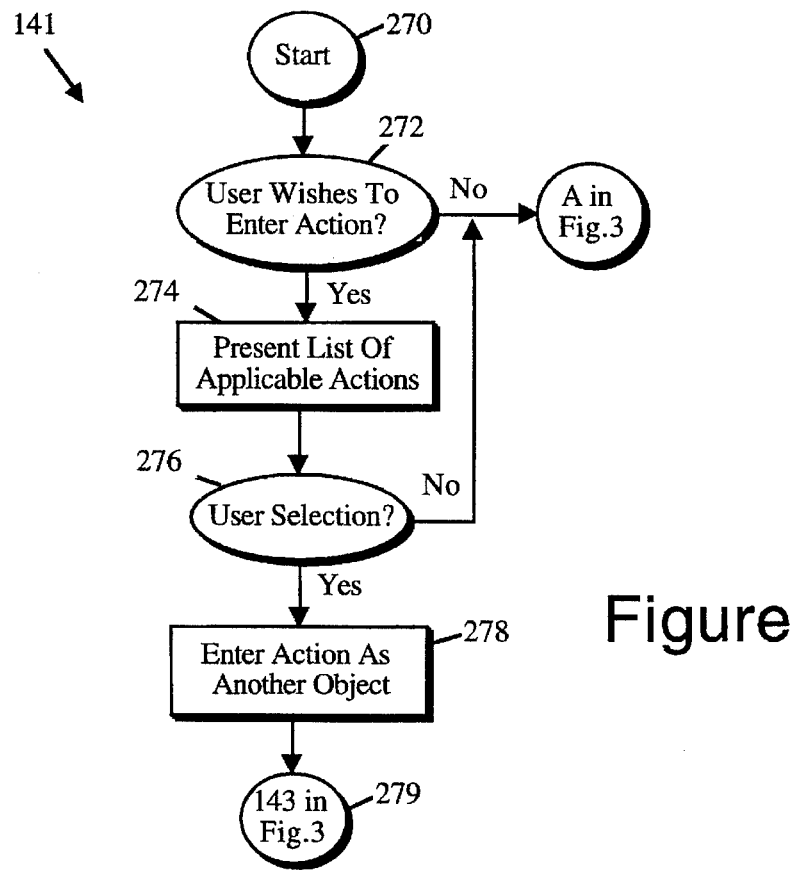
FIG. 12b is a flow diagram setting forth a process for determining whether the user wishes to provide or supply a particular action.
Figure 12C:
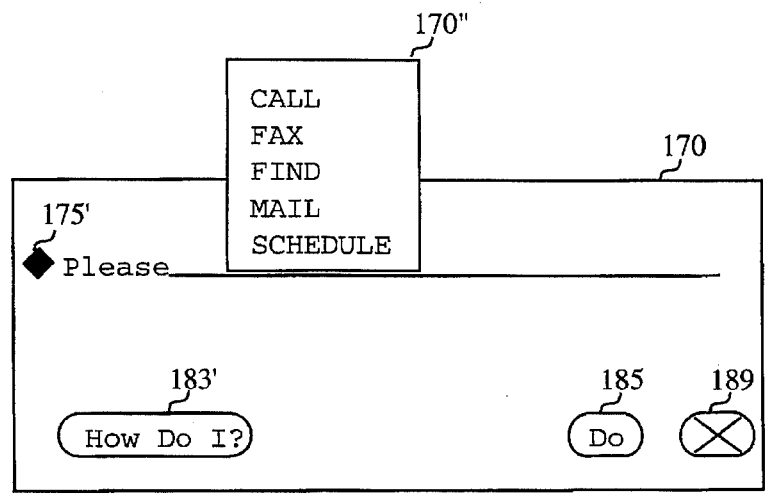
FIG. 12c shows a window with a menu partially overlapping its topside in order to provide the user with an array of activity choices.

Alternatively, if the user does wish to provide or enter a particular action, the process can continue for example with the presentation of a particular list of applicable actions, as indicated at step 274 of FIG. 12b. This approach is graphically illustrated in FIG. 12c, which shows presentation of the list of actions being made as a pull-down menu 170" partially superimposing over window 170.

Figure 12D:
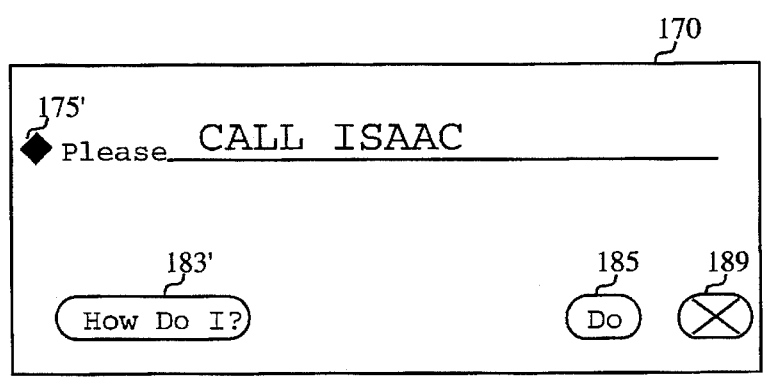
FIG. 12d shows the window of FIG. 12c with the activity of calling having been selected, establishing the combined objects CALL and ISAAC in the activity field of the window.

Next, the user may make a selection of the proposed list of actions, as set forth at step 276 of FIG. 12b. This may amount to having highlighted the call action verb in pull-down menu 170", to produce the image of FIG. 12d, in which the please field has the font formalism CALL ISAAC expressed explicitly in response to user selection. If the user fails to select, control again shifts to point A of FIG. 3 with a check as to whether an implicit assist is desired. On the other hand, if the user has made a particular selection, the action is entered as another object at step 278 of FIG. 12b. The process then continues at 143 of FIG. 3, as shown in FIG. 12b, which amounts to undertaking preparations for execution of the particular action called for.

Figure 13:
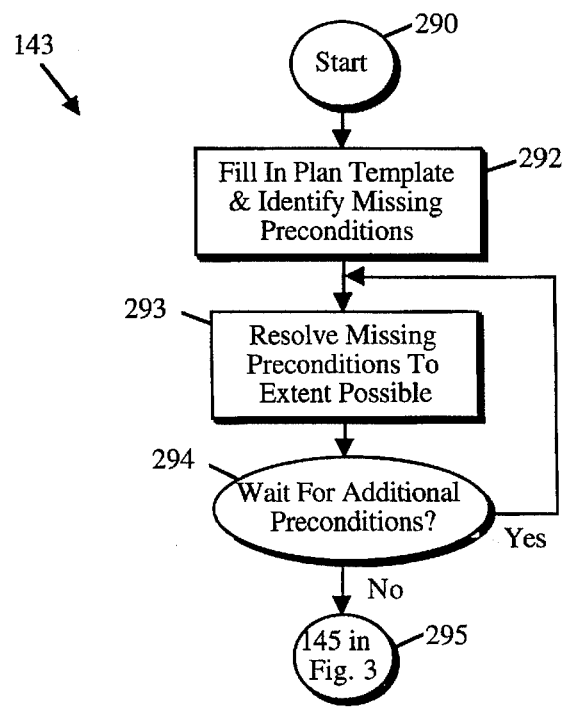
FIG. 13 illustrates the process for preparing for execution of a particular activity.
Figure 14A:
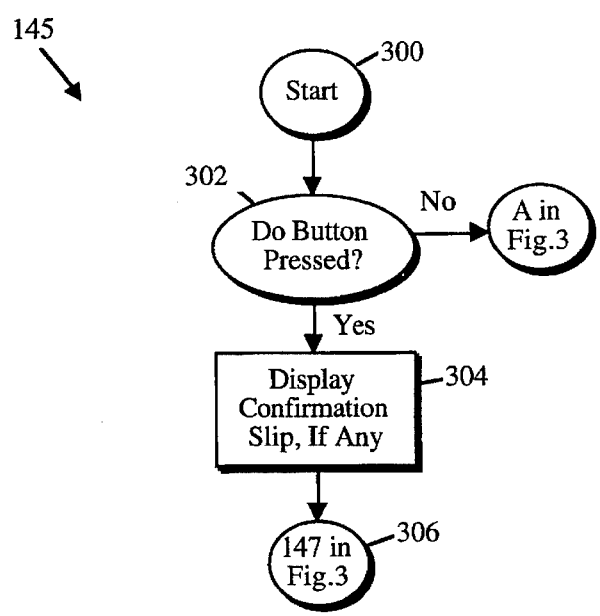
FIG. 14a is a short flow diagram of a process for determining whether to proceed with execution of a particular selected assist activity.
Figure 14B:
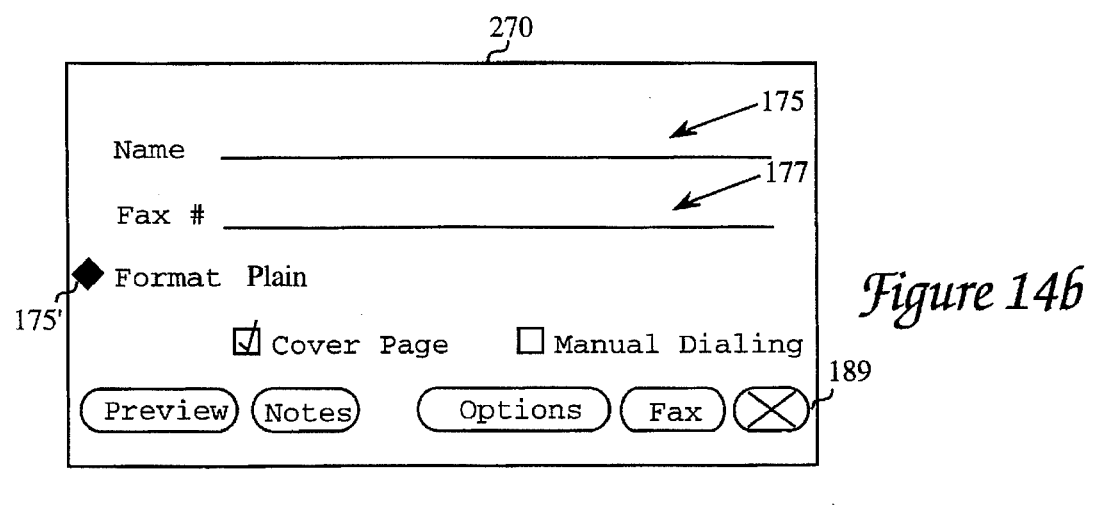

Preparation for execution is expressed in the process of FIG. 13, starting at step 290. The process calls for example for the filling in of a plan template and the identification of any missing preconditions, as set forth at step 292 of FIG. 13. Next, a step 293 resolves missing preconditions to the extent possible. As a next step, operation awaits additional preconditions to be fulfilled at step 294. A loop may be taken to repeat the resolution of missing preconditions at step 294 for at least a predetermined number of times. If it is desired not to wait for completion of any additional preconditions, the process ends at step 295, and action continues with the question as to whether to execute at 145 of FIG. 3. This can involve a process as for example set forth in FIG. 14a. The process starts at 300 and then ascertains whether the "DO" button has been tapped or depressed at a step 302. If yes, a confirmation slip or the like will be presented at a step 304, and then operation continues at 306 with execution according to step 147 on FIG. 3. A sample confirmation slip is indicated at FIG. 14b for convenience. If the decision is not to execute, then control passes to point A of FIG. 3. If execution is desired, then step 147 of FIG. 3 is undertaken.

Accordingly, the invention herein provides implicit and explicit assistance for a variety of user-supportive information functions. If no implicit assistance actions are desired or indicated, an investigation is undertaken whether explicit assistance is to be undertaken. If no explicit assistance is desired, a check is again made whether an implicit assist is desired. An inquiry is made whether the user should be queried. If so, a list of action alternatives is displayed for user selection. If no user selection of particular assistance is desired, then a process is undertaken to select a best alternative of several identified. If explicit assistance is undertaken and assistance is desired by the user, particular object(s) expressing the assistance action desired are entered into an assistance operation. If user selection of an assistance alternative has been made, the particular selected object(s) are entered into assist operation. An attempt may then be made to recognize possible intents expressed by the objects entered into the assistance process. A check is further undertaken, to determine whether a hypothesis is in fact available. If no hypothesis is found, the process permits the user to supply a proposed action. If no hypothesis is found and no user action is proposed, assistance efforts terminate. However, if a hypothesis is available, preparations for execution are undertaken. A final inquiry is made as to whether to undertake the hypothesized assist. If the response to an inquiry whether to assist as hypothesized is affirmative, execution of the hypothesized action is undertaken.

While this invention has been described in terms of several preferred embodiments, there are alterations, permutations, and equivalents which fall within the scope of this invention. It should also be noted that there are may alternative ways of implementing the processes of the present invention. For example, much of the programming can be simplified by using the high-level utilities and data structures mentioned in the preceding specification. In particular, the described frame database system is preferred for simplifying the programming tasks required by the computer implemented processes of the present invention, but there are many other database and graphics systems which can be used to accomplish the same task. In general, the invention includes a method and apparatus for providing computer-assisted assistance, including the steps of noticing an event occurring within a computer system, determining whether the event from its context is suited for implicit assistance, and, if so, providing such implicit assistance, and determining whether explicit assistance is indicated, and, if indicated, providing such explicit assistance. The context includes such considerations, for example, as entry in a smart field window, and relationships between particular objects used in the assistance operation. The invention further includes a computer system having assistance capabilities and comprising computation means to perform a range of assistance functions, a memory in communication with the computation means to maintain a data base of assistance-pertinent events, a system for noticing events and occurrences which might require assistance, an arrangement for determining whether explicit and/or implicit assistance are indicated, and the necessary structures and functions effective for providing the needed or requested assistance.

It is therefore intended that the following appended claims be interpreted as including all such alterations, permutations, and equivalents as fall within the true spirit and scope of the present invention.

What is claimed is:

1. A computer system having assistance capabilities, comprising:
   (a) computation means for performing assistance functions,
   (b) memory means for maintaining a data base of assistance-pertinent events, said memory means being coupled to said computation means,
   (c) means for providing a smart field responsive to information of a predefined type.
   (d) means for noticing assistance-pertinent event occurrences subject to potential assist action performance, the means for noticing assistance-pertinent event occurrences including:
      means for determining whether the information of a predefined type has been entered into the smart field; and
      search means responsive to the entry of the information of a predefined type into the smart field, the search means operable for searching a portion of the data base of assistance-pertinent events associated with the type of information of the smart field to identify and compile a list of any alternatives matching or partially matching the specific information entered in the smart field,
   (d) means for determining whether implicit assistance responsive to the event is indicated, and
   (e) means for providing the implicit assistance indicated.

2. A computer system as recited in claim 1 wherein said means for providing the implicit assistance indicated includes means for automatically displaying an icon adjacent to the smart field, the icon indicating the existence of the compiled list.

3. A computer system as recited in claim 1 wherein said means for providing the implicit assistance indicated further includes:
   means for determining when the icon has been selected; and
   means for displaying the compiled list when the icon has been selected.

4. A computer system as recited in claim 1 wherein said means for providing the implicit assistance indicated includes means for automatically displaying the compiled list.

5. A computer system as recited in claim 1 wherein said means for providing the implicit assistance indicated includes:

means for displaying the compiled list; and means for enabling a user of the computer system to select an alternative from the compiled list.

6. A computer system as recited in claim 5 further including means for updating the database to contain information regarding the selected alternative.

7. A computer system as recited in claim 1 wherein the nature of the smart field is indicated by text, graphics, or a combination of text and graphics.

8. A computer system as recited in claim 1 wherein the smart field is responsive to information selected from the group consisting of persons, telephone numbers, dates, document names, account numbers, addresses, and access codes.

9. A computer system as recited in claim 8 wherein the database is comprised of templates, each template comprised of linked fields, each linked field being selected from the group consisting of persons, telephone numbers, dates, document names, account numbers, addresses, and access codes.

10. A method of providing implicit assistance on a computer system, the method comprising the steps of:

maintaining a database of assistance-pertinent events on a memory of the computer system;

displaying on a display screen of the computer system a smart field responsive to information of a predefined type;

determining whether information of a predefined type has been entered into the smart field by a user of the computer system;

searching a portion of the data base of assistance-pertinent events associated with the type of information of the smart field to identify and compile a list of any alternatives matching or partially matching the specific information entered into the smart field;

determining whether implicit assistance responsive to the specific information entered in the smart field is indicated; and providing the indicated implicit assistance.

11. A method as recited in claim 10 wherein the step of providing the indicated implicit assistance includes the substeps of:

automatically displaying an icon adjacent to the smart field, the icon indicating the existence of the compiled list;

determining whether the icon has been selected; and displaying the compiled list when the icon has been selected.

12. A method as recited in claim 10 wherein the step of providing the indicated implicit assistance includes the substep of automatically displaying the compiled list.

13. A method as recited in claim 12 wherein the step of providing the indicated implicit assistance further includes the substeps of:

receiving a user selection from the compiled list; and updating the database to contain information regarding the selected alternative.

14. A method as recited in claim 10 further including the step of displaying text, graphics or a combination of text and graphics in order to indicate the nature of the smart field.

15. A method as recited in claim 10 wherein the smart field is responsive to information selected from the group consisting of persons, telephone numbers, dates, document names, account numbers, addresses, and access codes.

16. A method as recited in claim 15 wherein the database is comprised of templates, each template comprised of linked fields, each linked field being selected from the group consisting of persons, telephone numbers, dates, document names, account numbers, addresses, and access codes.

17. A computer program stored on a computer readable medium, the computer program comprising computer executable instructions for:

maintaining a database of assistance-pertinent events on a memory of a computer system executing the computer program;

displaying on a display screen of the computer system a smart field responsive to information of a predefined type;

determining whether information of a predefined type has been entered into the smart field by a user of the computer system;

searching a portion of the data base of assistance-pertinent events associated with the type of information of the smart field to identify and compile a list of any alternatives matching or partially matching the specific information entered into the smart field;

determining whether implicit assistance responsive to the specific information entered in the smart field is indicated; and providing the indicated implicit assistance.

18. A computer program as recited in claim 17 wherein the computer executable instruction for providing the indicated implicit assistance includes subinstructions for:

automatically displaying an icon adjacent to the smart field, the icon indicating the existence of the compiled list;

determining whether the icon has been selected; and displaying the compiled list when the icon has been selected.

19. A computer program as recited in claim 18 wherein the computer executable instruction for providing the indicated implicit assistance further includes the subinstructions for:

receiving a user selection from the compiled list; and updating the database to contain information regarding the selected alternative.

20. A computer program as recited in claim 17 wherein the smart field is responsive to information selected from the group consisting of persons, telephone numbers, dates, document names, account numbers, addresses, and access codes, and the database is comprised of templates, each template comprised of linked fields, each linked field being selected from the group consisting of persons, telephone numbers, dates, document names, account numbers, addresses, and access codes.

* * * * *